Inventor
Bradley A. Rutenber
By Fred G. Parsons
Attorney

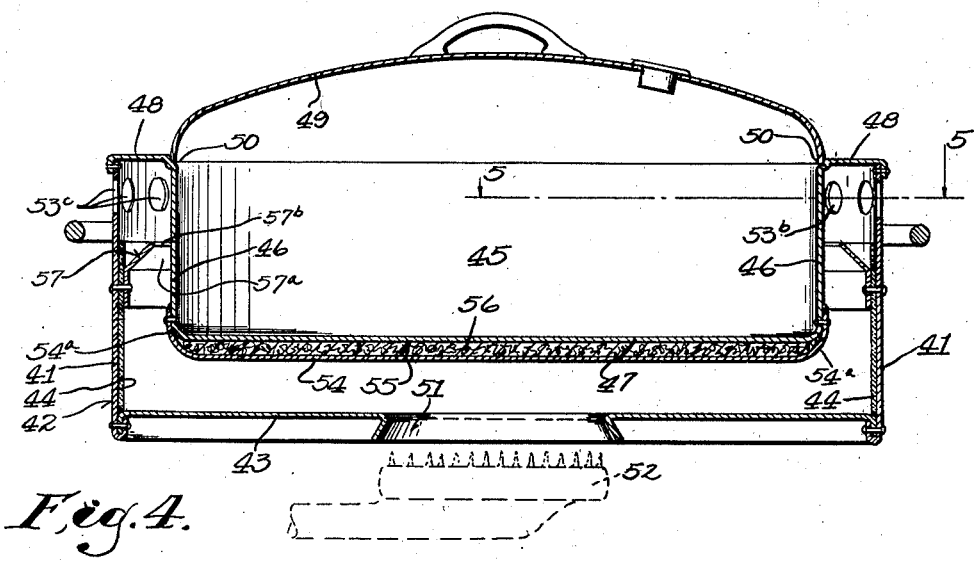
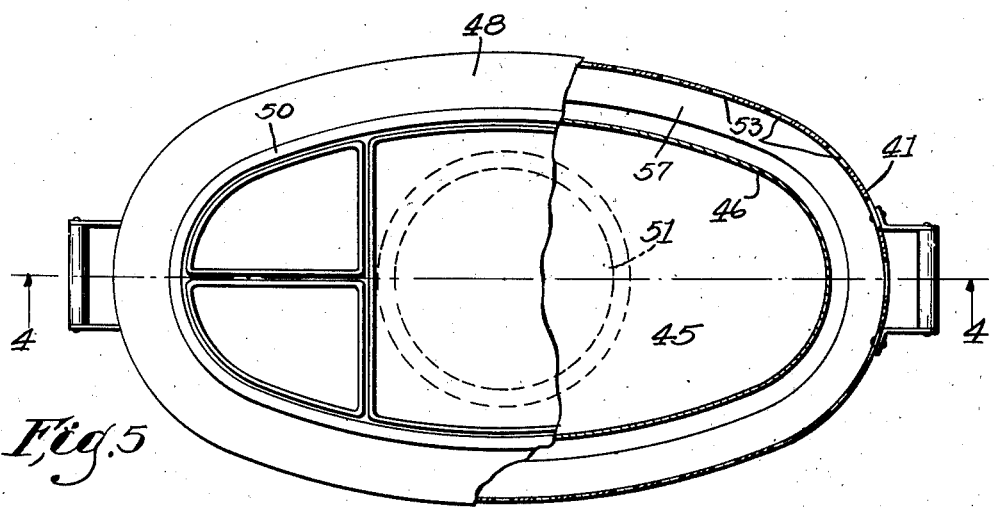
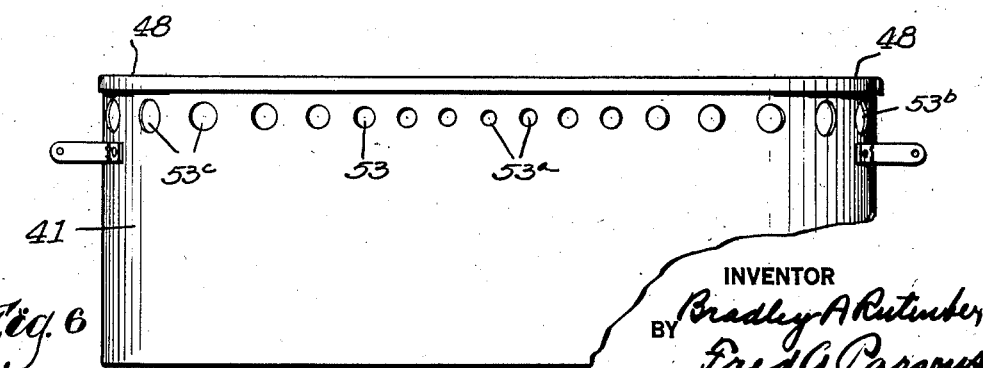

Patented Apr. 4, 1939

2,152,924

UNITED STATES PATENT OFFICE 2,152,924

COOKING UTENSIL

Bradley A. Rutenber, Milwaukee, Wis.

Application March 1, 1937, Serial No. 128,303

10 Claims. (Cl. 126—275)

This invention relates to cooking utensils and more particularly to a cooker adapted for the baking, roasting, boiling etc. of food stuffs, and for simultaneously cooking several foods of different nature, as for instance meats and vegetables.

A purpose of the invention is to provide an improved utensil which will cook various foods, as meats, vegetables etc. with a minimum addition of water, whereby to retain a maximum of the useful food value in usable form.

A further purpose is to provide an improved cooking utensil which will cook various foods, and especially meats, without material shrinkage in volume.

A further purpose is to provide a cooking utensil for the purposes mentioned in an improved form for use with a heat source such as an open flame or the like while avoiding direct application of the flame to the exterior of the utensile, or to the food containing portions thereof.

A further purpose is to provide an improved cooking utensil which will permit of the substantially uniform heating of preferred portions of the utensil, such as the sides and bottom of the food containing portion thereof, from a localized heat source such as a gas or oil burner or the like.

A further purpose is to provide a utensil which can be uniformly heated in the manner just mentioned while the heat source is unequally spaced relative to different portions to be heated, as for instance applied to the geometrical center of a utensil which is relatively long and narrow, or applied adjacent one end of such a utensil.

A further purpose is to provide a relatively large utensil, suited for simultaneously cooking a number of different foods, which can be used on ordinary forms of gas or similar stoves to utilize one burner thereof while leaving other burners free for other uses.

A further purpose is to effect a cooking utensil which can be economically operated to cook a variety of foods from the flame of a single burner.

A further purpose is generally to simplify and improve the construction and operation of cooking utensils, particularly for one or more of the purposes previously mentioned, and especially for use with a localized heat source such as a flame or the like, and still other purposes will be apparent from the specification.

The invention consists of the construction and combination of parts as herein illustrated, described and claimed, and in such modifications of the structure illustrated and described as may be equivalent to the claims.

The same reference characters have been used to indicate the same parts throughout the specification, and in the drawings:

Figures 4, 5 and 6 show a modified form of the invention, also incorporating the invention in some of its broader aspects.

Figure 1:
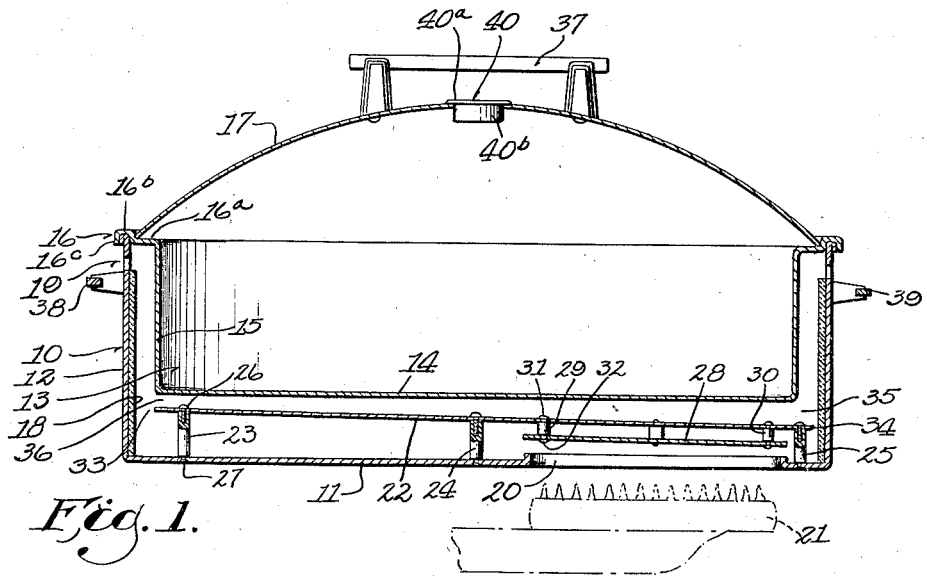
Figure 1 is a central vertical section of a cooking utensil which incorporates the invention.

The utensil of Fig. 1 has an outer shell or frame, generally denoted by the numeral 10, of length greater than width and of generally elliptical form, which includes a substantially flat bottom plate 11 and a side wall 12. An inner shell or container, generally denoted by the numeral 13, of similar but substantially smaller elliptical form comprises a bottom wall 14, a side wall 15 and an outwardly extended flange 16 around the top edge of the side wall, the flange being formed with an inner depressed portion 16a and a raised edge 16b. A cover 17 rests on the depressed flange portion 16a and fits closely but removably inside the raised edge 16b.

The flange 16 is also formed to provide a downwardly open groove 16c to receive the top edge of the outer container wall 11 in a manner to removably locate the inner container for the side wall 15 thereof to stand in predetermined spaced relationship to the side wall 12 of the outer container. A layer of heat insulating material, such as an asbestos sheet 18, is removably fixed closely adjacent the inner surface of the side wall 12, and extends substantially completely about the side wall, and from the bottom wall 11 to a point closely adjacent to a series of spaced vent holes generally denoted by the numeral 19, spaced apart horizontally and piercing the side wall 12 about its periphery and adjacent its top edge.

The removable inner container 13 may be used to directly receive food to be cooked, but it is ordinarily preferable to provide for such purpose other smaller containers such as 13a, 13b, 13c removably within the container 13 and dividing its capacity to separately receive different foods.

The bottom plate 11, at a point adjacent one end of the elongated utensil is provided with an opening 20 to receive the upflow of heated gases and flame from a burner therebeneath, as for instance the gas burner 21. The heated gases from burner 21 are distributed to rise upwardly through a passageway formed in part by the opening 20, and in part by the chamber within the side walls 12 underneath the bottom plate 14 of the inner receptacle, and in part by the space between the side walls 12, 15. Underneath the bottom wall 14 of the container 13 is a baffle plate 22 maintained in spaced relation to the bottom wall 11 of the outer container 10 and the bottom wall 14 of the inner container 13 by the means of posts or spacers such as 23, 24, 25 and screws such as 26, 27, whereby both the plate and the spacer posts are removable. Fixed to the plate 22 is another plate 28, located directly above the opening 20 whereby to directly receive flame from the burner 21, plate 28 being supported in spaced relation between the plate 22, and the bottom plate 11 of the outer container 10 by the means of posts or spacers such as 29, 30 and screws such as 31, 32.

Figure 2:
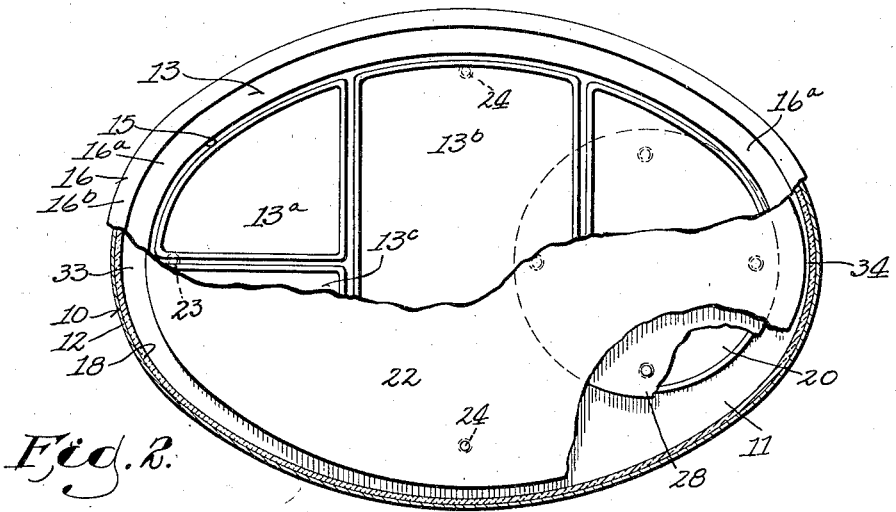
Figure 2 is a plan view of the same utensil with cover removed, and certain portions broken away.
Figure 3:
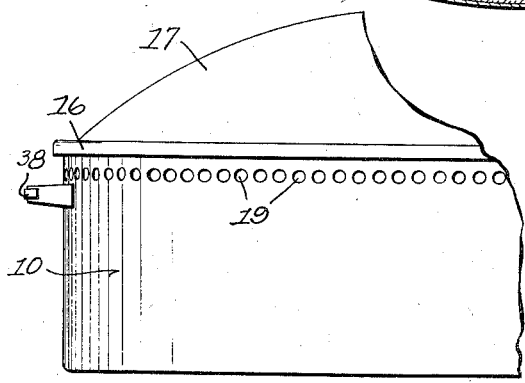
Figure 3 is a partial side view of the utensil shown in Fig. 1.

The plate 22, although of elliptical form similar to the shell 13 and container 10, is in offset relation whereby the space between the edge of the plate and the wall 15 is materially less at the end of the utensil adjacent the opening 20 than at the other end, as is shown at the points 33, 34, Figs. 1, 2. As a result of such offset the heated gases from burner 21 will meet materially greater resistance in their escape at the end of the utensil adjacent the opening 20 than at the other end, and plate 22 is formed at intermediate points for the upward passage past the edges of plate 22 to present gradually lessened resistance, substantially proportioned to the distance from the opening 20.

The result of the offset arrangement of the plate 22 is to provide an upflow of gases between the walls 12 and 15 of the different containers which substantially equally heats the inner container wall 15 at all points of its periphery. It is ordinarily sufficient for this purpose, in this form of the structure, to provide the series of outlet holes 19 to be of equal diameter. These holes may, however, be of different diameter at different points in the periphery of the outer wall 12 whereby to supplement the result effected by the relative offsetting of the plate 22 and the inner container 13, to insure that the side wall 15 of the inner container is equally heated at all points. The modified form of structure, Figs. 4, 5, 6, shows outlet holes of graduated diameter. It may also be noted that substantially the same result may be effected by offsetting the inner container 13 instead of the plate 22, or by offsetting both, but in lesser degree.

The intermediate plate 22, together with the substantially parallel plate 28 is angularly disposed horizontally, whereby both plates stand at greater distance from the bottom wall 14 of the inner container at the end adjacent the opening 20 than at the other end, as shown in Fig. 1 at the points 35 and 36. This result is effected by making the posts 23, 24, 25 of suitable length for the purpose. The arrangement is such that the plate 22 stands increasingly closer to the bottom plate 14 in the direction of the end of the container most distant from the opening 20. The result of this arrangement is to supplement the other structure whereby to substantially equally heat all portions of the bottom plate 14 as well as the side wall 12, in spite of the fact that the application of heat is adjacent to the one end of the receptacle 13. It will be noted that, while the previous description has been made with especial reference to heating of the side wall 15 and bottom plate 14 respectively, in practice the results are complementary and, at least to some extent, the offset arrangement tends to promote equal heating of the bottom plate while the angular arrangement of the baffle tends to promote equal heating of the side wall. In any event the combination of offset and angular relationships, as described, together results in substantially equal heating throughout the entire area of the side wall 15 and the bottom plate 14, whereby substantially the entire interior of the inner receptacle 13 is equally heated. This is true substantially irrespective of the amount of heat applied from the burner 21. In other words whether the gas burner 21 is turned up to apply a large quantity of heat, or turned down to apply a small quantity of heat the entire wall of the inner container 13 exposed to the heat will be heated at substantially equal temperature, the temperature being directly proportional to the amount of heat applied from the burner.

The cover 17 is of dome-like construction, and no portion thereof is directly exposed to the heat of the gases from the burner 21. As a result of this arrangement, and of the manner in which the cover is fitted to the inner container, as previously described, any moisture arising from the contents of the receptacle 13 will be condensed on the inside wall of the cover 17 and returned to the inner receptacle 13. For the most part such moisture drops down as soon as condensed, and therefore is returned directly into the supplemental containers 13a, 13b, 13c.

Suitably insulated handle members are provided, both for the cover 17, as at 37, and for lifting the entire utensil as at 38, 39, but since a variety of such handle structures are well known they are not here described in detail.

At an upper level of the cover 17 there is provided a suitable thermometer device generally denoted by the numeral 40. This device may be of any suitable form such that a temperature dial or chart portion 40a is exposed outside the cover while a temperature responsive portion 40b stands inside the cover to be exposed to the heated interior. The air contained within the inner receptacle 13 and cover 17 is continuously circulating, but is normally hottest at the highest point, and it is at this point that the heat responsive portion 40b of the thermometer is preferably located.

One of the reasons for the position of the heat receiving opening 20 adjacent to the one end of the utensil is to permit the utensil to be positioned on the ordinary form of gas or oil stove to utilize the heat of one of the burners thereof while leaving other burners available for other purposes. With the utensil formed with an offset heat receiving opening as described a relatively large utensil, suited for simultaneously cooking various foods, can be positioned on the top of any commercial type of stove to utilize one of the burners while leaving the others free for other purposes. If the stove contains a front and rear series of burners the utensil can ordinarily be placed on the stove with its longer axis running from front to rear to utilize either a burner of the front series or of the rear series, whichever may be the more convenient.

The modified form of structure shown in Figs. 4, 5 and 6 also incorporates the invention in its broader aspects. The utensil there shown includes an outer receptacle generally denoted by the numeral 41 having an outer wall 42 of generally elliptical form as shown in Fig. 5, a bottom wall 43 and an insulating liner 44. The utensil also includes an inner receptacle generally denoted by the numeral 45 having an outer wall 46 and a bottom wall 47. A flange 48 extends outwardly from the side wall 46 to engage the upper edge of the outer wall 42 of the outer receptacle, whereby to locate the outer wall of the inner receptacle relative thereto. In this instance also the outer wall of the inner receptacle is of elliptical form similar to the outer receptacle. A cover 49 is removably retained in a groove or recess 50.

The bottom plate 43 is provided with an opening 51 located substantially in the geometrical center of the utensil to receive heat from a burner 52, but even with the opening so located the heated gases will, unless prevented, tend to heat the ends of the inner utensil 45 less than the center thereof. To avoid such uneven heating a series of heat outlet holes generally indicated at 53 is provided to have holes of diameter increasing toward the ends of the receptacle, the center holes such as 53a being of materially smaller area than the holes adjacent the ends, such as 53b, 53c. A plate 54 is retained in spaced relationship between the bottom plate 43 of the outer receptacle and the outer portion of the inner receptacle, the edges of the plate 54 being upturned and fixed with the inner receptacle as at 54a. The space between the bottom plates 47 and 54 provides a substantially completely sealed chamber generally denoted by the numeral 55, which may be filled with insulating material 56, as for instance with asbestos wool. In some instances the bottom plate 47, similarly to the baffle plate 22 of the utensil of Fig. 1, is spaced farther from plate 46 at points adjacent the opening 51 than at other points, whereby to provide greater insulation at points where the heat is greatest, to further the equal heating of the walls of the inner receptacle. To supplement the other heat equalizing means a baffle 57 is fixed with the side wall 42 to provide an inwardly extending flange 57a restricting the passageway for the upward flow of heated gases as at 57b. The baffle 57 extends substantially completely around the periphery of the inner container 55 and the inwardly extending portion 57a is of such form as to restrict the upward flow of heated gases more at one point than at another on the periphery of the inner container, to modify the operation of the graduated diametered holes of the series of outlet holes 53.

Similarly to the structure of Fig. 1 the structure and arrangement of the device of Fig. 4 provides for a substantially uniform heating of the entire area of the side walls 46 and bottom wall 47 of the inner receptacle 45. In the event that the structure of Fig. 4 is constructed with the heat inlet opening 51 offset as in the structure of Fig. 1 suitable modifications are made, either in the spacing of the bottom plate 54 from the bottom plate 47, or in the area of the holes 53a, 53b etc. at various points in the periphery of the outer container, or in the width of the gas passage space 57b at various points about the periphery of the container wall 46, to compensate for the offset whereby to effect uniform heating of the inner container.

What is claimed is:

1. A cooking utensil including an outer shell and an inner receptacle having walls providing a passageway for the upward flow of heated gases, an inlet opening for said passageway unequally spaced from different side wall portions of said inner receptacle, an outlet for said passageway at the upper level of said utensil and means for equalizing the heating of said different side wall portions including means limiting the flow of gases adjacent the side wall portions nearest said inlet relative to other side wall portions.

2. A cooking utensil including an outer shell and an inner receptacle together providing a passageway for the flow of heated gases, an inlet opening for said passageway unequally spaced from different side wall portions of said inner receptacle, an outlet for said passageway at the upper level of said utensil and means operative to unequally restrict the flow of gases in different portions of said passageway to effect substantially equal heating of said side wall portions.

3. A cooking utensil including an outer shell and an inner receptacle having mutually spaced side and bottom walls together providing a passageway for upward flow of heated gases including an inlet opening in the bottom wall of said shell, said side walls being spaced substantially equally at substantially all points in the lateral periphery of said inner receptacle, and a baffle plate substantially horizontally disposed within said passageway, the edges of said plate being unequally spaced relative to the side wall of said shell whereby to predetermine an equalized heating of the side wall of said receptacle at all of said point.

4. A cooking utensil including an outer shell, an inner receptacle having a bottom wall, the walls of said shell and receptacle providing a passageway for upward flow of heated gases including an opening underneath said bottom wall, a heat distributing plate supported above said opening in spaced relation underneath said bottom wall, and another and relatively smaller plate in spaced relation underneath the first mentioned plate at a point to directly receive the heating effect of a burner underneath said opening, portions of the first mentioned plate adjacent said opening being spaced materially farther from said bottom wall than other portions more remote from said opening.

5. A cooking utensil including an outer shell having a bottom wall, an inner receptacle having a bottom wall spaced above the bottom wall of said outer shell to provide a bottom chamber, said shell and receptacle having side walls spaced to provide a passageway upwardly from said chamber and extended substantially around the periphery of said inner receptacle, the bottom wall of said shell providing an opening for the inflow of heated gases into said chamber, said opening being offset from the geometrical center of the bottom wall of said receptacle, and heat shielding and regulating means for the bottom wall of said receptacle and having materially greater shielding effect at points adjacent said opening than at other points.

6. A cooking utensil including an outer shell, an inner receptacle having a bottom wall spaced above the bottom of said shell to provide a bottom chamber, said shell and receptacle having side walls spaced to provide a passageway upwardly from said chamber and extended substantially around the periphery of said inner receptacle, the bottom of said shell providing for entry of heated gases upwardly into said chamber, the point of entry of said gases being offset from the geometrical center of the bottom wall of said receptacle, and means operative to substantially uniformly distribute the heat of said gases to the 7. A cooking utensil including an outer shell having a bottom wall, an inner receptacle having a bottom wall spaced above the bottom wall of said outer shell to provide a bottom chamber, said shell and receptacle having side walls spaced to provide a passageway opening upwardly from said chamber and extended substantially around the periphery of said inner receptacle, an inlet opening for entry of heated gases into said chamber through the bottom wall of said shell, said inlet opening being spaced at greater distance from some portions of said passageway opening than others, and baffle plate means between said inlet opening and the bottom wall of said receptacle of a form and spacing operative to effect substantially uniform heating of both the side wall and bottom wall of said receptacle in spite of said difference in distance.

8. A cooking utensil including an outer shell, an upwardly open inner receptacle having a bottom wall spaced above the bottom level of said shell to provide a bottom chamber, said shell and receptacle having mutually spaced side walls providing a passageway upwardly from said chamber and extended substantially around the periphery of said receptacle, said shell providing for entry of heated gases upwardly into said chamber at a point unequally spaced relative to different portions of the receptacle side wall, and means operative to substantially uniformly distribute the heat of said gases to said receptacle side walls in spite of the unequal spacing of the point of entry of the gases.

9. A cooking utensil including an outer shell having side walls providing an outer form which is relatively long and narrow in horizontal cross section, an inner receptacle having a bottom wall spaced above the bottom level of said shell to provide a bottom chamber, said receptacle having side walls spaced interiorly of the side walls of said shell to provide a passageway upwardly from said chamber and extended substantially around the periphery of said receptacle, said shell providing for entry of heated gases upwardly into said chamber in an area unequally spaced relative to different points of entry of the gases into said passageway, and means operative to substantially uniformly distribute the heat of said gases to the bottom and side walls of said receptacle in spite of said unequal spacing.

10. In a cooking utensil the combination of an upwardly open inner receptacle having a bottom wall and side walls of substantially elliptical exterior form in horizontal cross section, an outer shell having side walls spaced from the side walls of said receptacle to provide an upward passageway for heated gases and extending substantially around the horizontal periphery of the receptacle, said shell extending below the bottom wall of the receptacle to provide a chamber opening upwardly into said passageway, means at the lower level of said shell to limit the entry of heated gases into said chamber to a zone more distant from one end of said elliptical form than from the other end thereof, means for the substantially uniform distribution of the heat of said gases to the side and bottom walls of said receptacle in spite of said difference in distance, and a cover for said receptacle, said cover and receptacle walls substantially sealing the interior of said receptacle from entry of said gases.

BRADLEY A. RUTENBER.